Oct. 29, 1957  H. O. SCHILD ET AL  2,811,202
PROGRAM CONTROLLER
Filed July 14, 1953  3 Sheets-Sheet 3
FIG. 3.
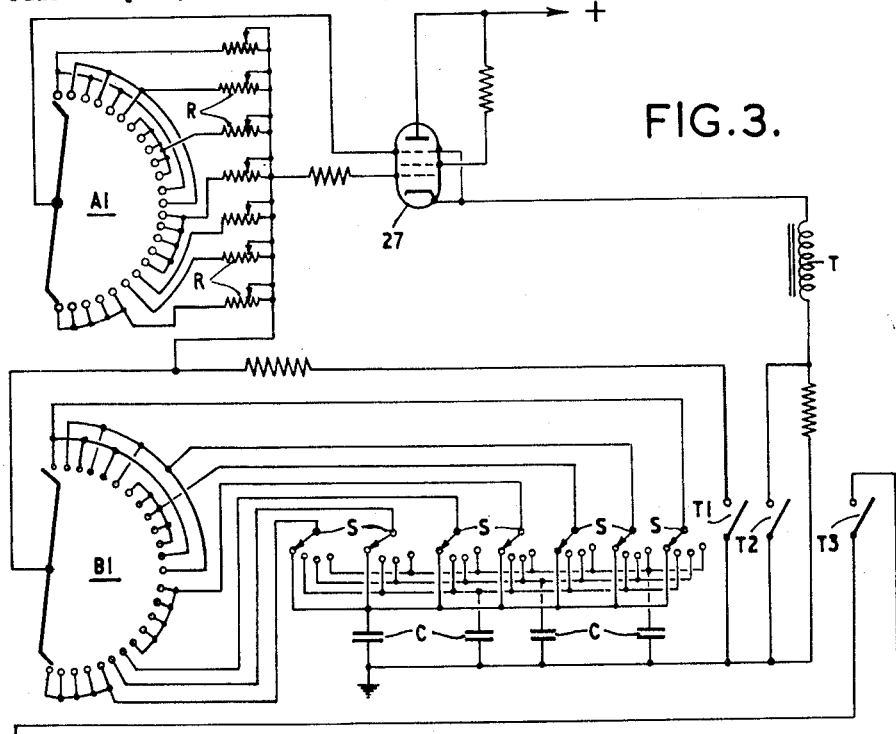
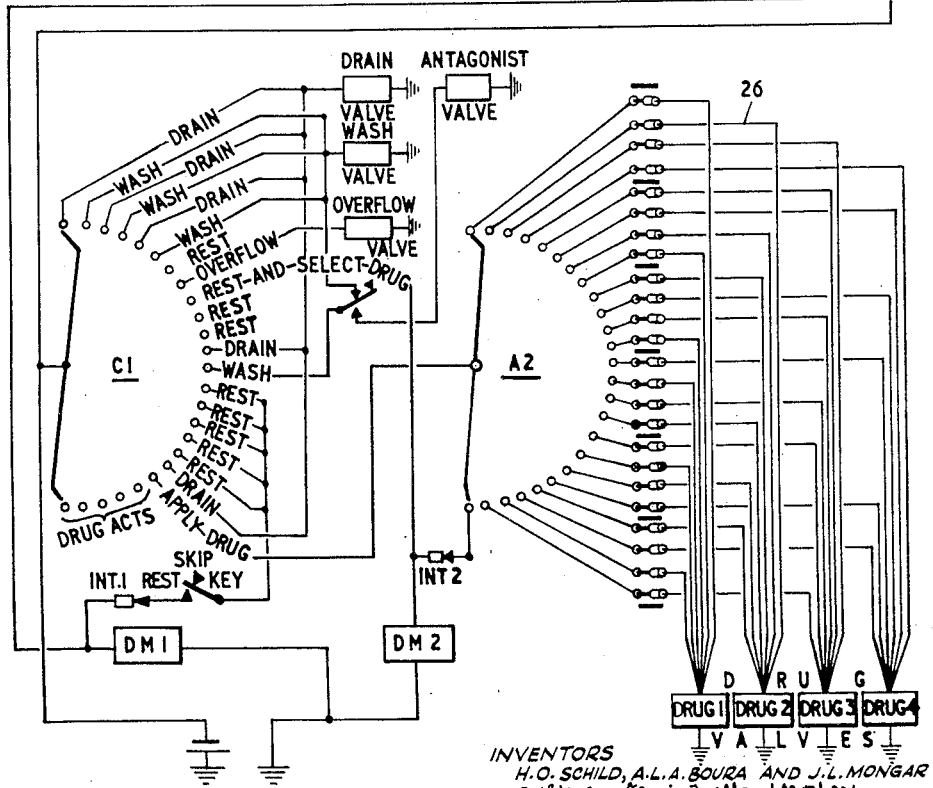
INVENTORS
H. O. SCHILD, A. L. A. BOURA AND J. L. MONGAR
By Stevens, Davis, Miller & Mosher
ATTORNEYS United States Patent Office 2,811,202
Patented Oct. 29, 1957

2,811,202
PROGRAM CONTROLLER

Heinz Otto Schild, Fetcham, near Leatherhead, Alan Louis Arthur Boura, Wilmington, Dartford, and John Lawrence Mongar, Barnet, England, assignors to National Research Development Corporation, London, England, a British corporation Application July 14, 1953, Serial No. 367,966
Claims priority, application Great Britain July 16, 1952
3 Claims. (Cl. 161—7)

This invention relates to apparatus for the assay of drugs by the biological method, in which the concentrations, or potencies, of drug solutions are measured by comparing the reactions of an isolated living organ brought into contact with the several solutions. In a typical case the organ is brought into contact successively with four solutions: one of the concentration to be assayed, one of a standard concentration of the same drug and of similar activity, and two representing these solutions diluted by the same amount. In between each treatment with a drug solution the organ is subjected to a number of washing treatments with a saline solution and to the action of an antagonist. This so-called four-point assay, or cycle of operations, is repeated a number of times and the results are averaged.

It is essential in carrying out this type of assay to supply the various solutions to the organ at a constant temperature and free from the smallest trace of impurity. It is further essential to ensure that the time occupied by each step of the cycle shall be the same for every repetition, and desirable that the drug solutions shall be added in a different order in each cycle, the order being selected at random. The times required for the various steps depend on the nature of the drug and of the organ on which it is to act. The proper selection of these times is of critical importance in the successful operation of the assay.

Although proposals for automatising the assay have been published (see British Journal of Pharmacology and Chemotherapy volume 1, page 135, and volume 5, page 381), the general practice has hitherto been to add the several solutions to the organ by hand, but this is a tedious and laborious operation. The object of the present invention is to provide an apparatus in which the assay can be carried out automatically without violating the requirements set forth in the preceding paragraph and in which means are provided for pre-selecting any of an infinite number of values lying within a certain range for the timing of each step of the cycle of operations.

According to the present invention, there is provided a device for use in estimating the potency of a solution containing a given drug by repeated comparison of the effect of the solution under assay on an organ sensitive to the drug with that of a standard solution of the drug, in which the organ is contained in a vessel having a drain port controlled by a valve actuated by an electromagnetic relay, in which the various liquids with which the organ is to be contacted are held each in a reservoir having a discharge tube leading to the vessel containing the organ, the flow of each such liquid into the vessel being controlled by a valve actuated by an electromagnetic relay, and in which the valve-actuating electromagnetic relays are energized in the appropriate order through the wiper and contacts of one bank of a multi-bank uniselector, the wipers of which are together shifted at intervals determined by a timing device itself controlled through a circuit completed by the wiper(s) of at least one further bank of the multi-bank uniselector.

One particular form of the apparatus according to the invention comprises a bath in which the organ is suspended and which is provided with a drain port, a valve controlling this port, a number of reservoirs each containing one of the solutions to be added to the bath, ducts permitting separate communication between each reservoir and the bath, a number of valves each controlling flow of liquid from one of the reservoirs to the bath, a number of electrically operated relays for actuating the respective valves, a multi-bank uniselector the contacts of one bank of which are connected in a predetermined order with the respective relays, and a timing circuit adapted to provide, at intervals determined by the values of the resistance and capacity in the circuit, pulses for actuating the driving magnet of the uniselector, the said resistances and capacities being connected with the contacts of a further bank or banks of the uniselector in such a way that the said values are determined by the position of the uniselector wipers.

According to a feature of the invention, the connections between the various reservoirs and the organ bath are made wholly of glass or the like without the inclusion of valves, and one or more jackets are provided for bringing each solution to the required temperature during its passage from the reservoir to the bath, the control of the flow from each reservoir being effected by admission of the air thereto through a rubber or like tube controlled by one of the aforesaid valves. This arrangement makes it possible to drain the bath before each addition of a drug solution, in contradistinction to the method hitherto adopted of first adding a tyrode solution to the bath and then adding to it a suitably concentrated solution of the drug.

As mentioned above, the cycle of operations comprising the addition of all the drug solutions is repeated a number of times, the order in which the drugs are added at each repetition being varied in a random manner. A cross-connection field may be provided between the appropriate uniselector contacts and the valve relays, which enables the drug order to be pre-selected in any desired way. Preferably the drug order is determined by a second uniselector whose driving magnet is connected with appropriate contacts of the first uniselector. Selection of the drug order for each cycle is automatic, being predetermined by the connections made in the cross-connection field.

A preferred form of the invention is illustrated by way of example by the accompanying drawings in which:

Figure 3 is a diagram representing the means for controlling the assay apparatus.

Figure 1:
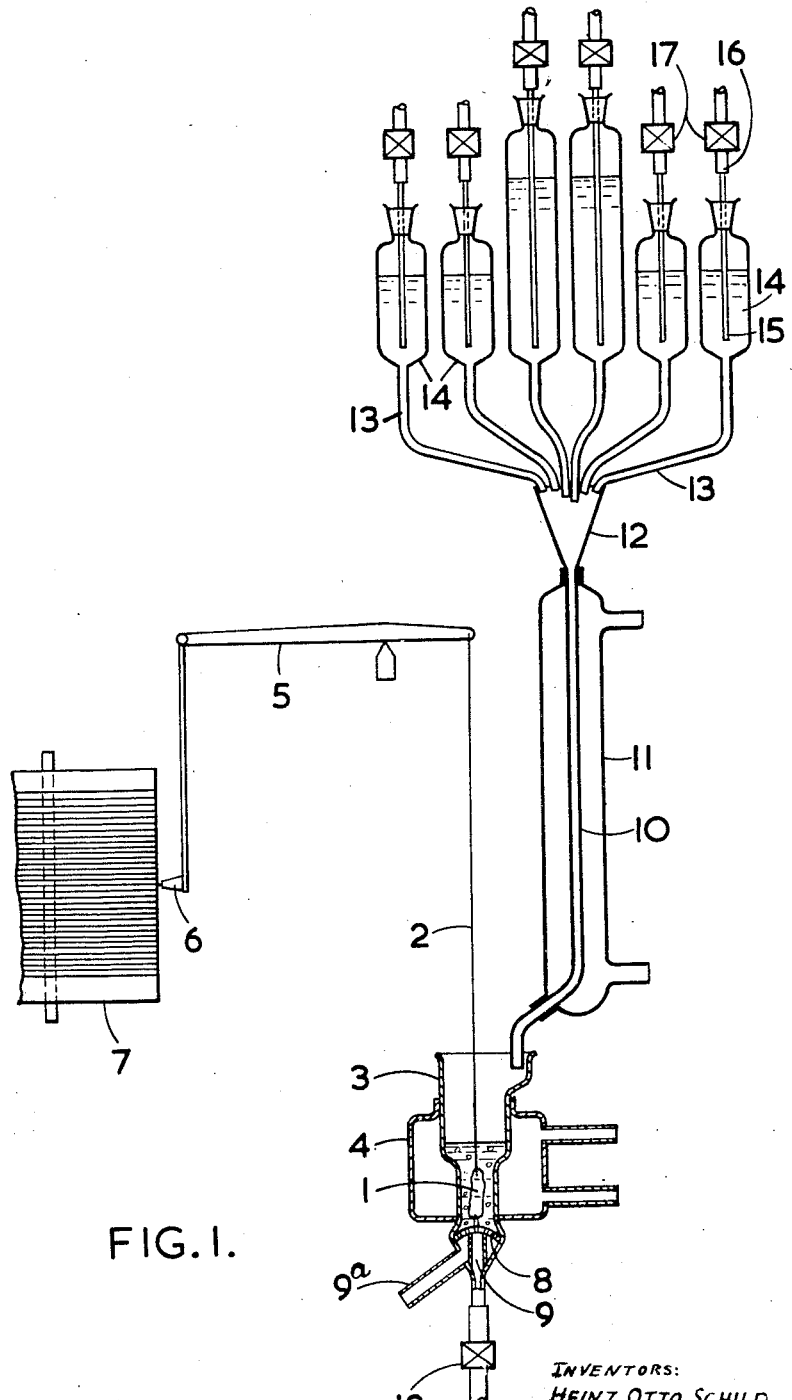
Figure 1 shows apparatus for carrying out a biological assay.

Referring to Figure 1 of the drawings, an isolated living organ 1 is suspended by a filament 2 in a bath 3 which is provided with a water jacket 4. The upper end of the filament is fixed to one end of a beam 5 whose other end carries a stylus 6 for recording the movements of the organ 1 on a rotating smoked drum 7 in the manner known per se. The lower end of the bath 3 is provided with a bridge 8 to which the organ in the bath is attached. The bridge 8 is perforated to give access to a drain pipe 9 at the bottom of the bath. A further perforation gives access to an annular space into which opens a pipe 9a for supplying oxygen to the bath. The upper end of the bath is open to atmosphere and receives the lower end of a tube 10 which is provided with a water jacket 11 and has a funnel 12 at its upper end.

Debouching into the funnel 12 are a number of tubes such as 13 leading from the lower ends of reservoirs such as 14. The two larger reservoirs contain the saline washing solution and drug antagonist solution respectively, while the smaller reservoirs contain the four drug solutions referred to above. Each reservoir has an airtight stopper through which passes a glass tube such as 15 connected with a rubber tube such as 16. Each of the rubber tubes is open to atmosphere and is provided with an electrically operable valve such as 17, while the drain pipe 9 of the organ bath is provided with a similar valve 18. In their normal positions the valves 17, 18 close the respective rubber tubes and prevent liquid from leaving the reservoirs or the organ bath as the case may be. When any valve is actuated the rubber tube is released and liquid is allowed to flow. It will be noted that this arrangement enables the whole of the apparatus with which the solutions come into contact to be made of glass, without obsrtuction by valves or the like. Moreover the tube 10 can be of sufficient length to ensure that the solutions reach the correct temperature before entering the bath 3, so that the modus operandi can be to drain the bath before each drug addition, instead of adding, as has hitherto been the usual practice, a small amount of concentrated drug solution to a saline solution already present in the bath.

Figure 2:
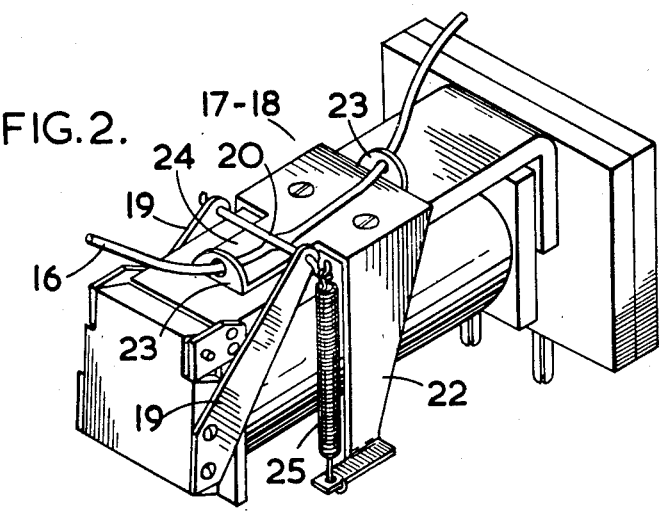
Figure 2 shows a relay-operated valve used in this apparatus.

One of the valves 17 or 18 is shown in Figure 2. The valve is built on to a relay of the type used in telephone equipment. The armature of the relay has fixed to it a pair of arms 19 carrying a pin 20. Fixed over the armature-carrying plate 21 is a yoke 22 having perforated lugs 23 through which the rubber tube 16 is passed, and a base plate 24. A tension spring 25 tends to hold the armature away from the magnet of the relay. In this position the pin 20 pinches the tube 16 against the base plate 24. When the relay is energised, however, the armature is attracted to the magnet and the tube 16 is released.

The main function of the control means shown in Figure 3 is to select a proper sequence and duration of energisation of the several valve relays. For this purpose there are used two uniselectors of the type used in automatic telephone exchanges. One of the uniselectors, having banks of contacts A1, B1, C1 is used to control what may be described as a sub-cycle, that is the sequence of washings, rest periods and antagonist addition which precedes the addition of a particular drug solution. The other uniselector, of which the bank of contacts A2 is shown, is used to determine which drug solution shall be added in each sub-cycle, and hence the order of addition over a full cycle of four drug additions. The driving magnets of the uniselectors are denoted by DM1 and DM2 respectively.

The outlets from the bank C1 are connected to the valve relays controlling the drain pipe and the saline and antagonist reservoirs, while the outlets from bank A2 are connected to the valve relays controlling the drug solution reservoirs.

The latter connections are by way of a cross-connection field indicated at 26, which enables the drug order to be pre-selected in a random manner. The connections of this field may conveniently be of the plug and socket type.

The driving magnet DM1 is actuated by a timing circuit which comprises a pentode 27, a relay T having contacts T1, T2 and T3, a variable resistance connected between the suppressor and control grids of the valve 27, and a varaible capacity connected between the control grid and earth. This circuit is such that pulses are produced in the cathode-anode circuit of the valve 27 at time intervals determined by the values of the variable resistance and capacity for the time being present in the circuit. Each of these pulses energises relay T, which closes contacts T1 and T2 to re-set the circuit, and closes contacts T3, thus energising drive magnet DM1 and stepping the wipers of the first uniselector over one contact. When first switched on, the grid and cathode of 27 are at the same potential and a small cathode current flows but not enough to operate T, as a potential builds up across the cathode resistor and T in series which tends to bias the tube in the direction of cut off though it cannot actually cut off the valve as the cathode current and the bias voltage would fall as the valve approached cut off. An equilibrium is momentarily attained but is not maintained because the cathode voltage across the cathode resistor and T commences to charge that one of the condensers C which is selected by B1, through that one of the resistors R which is selected by A1 and the grid rises positive towards the cathode voltage at a rate determined by the selected values of C and R. The cathode current rises as the grid rises positive until it is sufficient to operate T. When T operates it short-circuits the condenser C and the cathode current again falls to the equilibrium value mentioned above. The contacts T2 which short-circuit the cathode resistance serve to maintain the cathode current a fraction longer than would otherwise be the case so that T is held operated long enough to complete the discharge of condenser C at T1 and step the uniselector at T3. It also ensures that the starting conditions for each new cycle of operation of the valve are the same and are not affected by stray cathode circuit capacities. The outlets of banks A1 and B1 are connected to variable resistors R and a set of switches S. Each of the latter has four contacts and the contacts of all the switches are cross-connected with four condensers C in such a manner as to obtain a set of capacities. Thus at each step of the uniselector a particular value of the resistance and capacity is selected for the timing circuit, these values being predetermined by adjustment of resistors R and setting of switches S. Hence there is an infinite flexibility in the selection of the intervals between successive pulses of the timing circuit, and therefore between successive steps in the assay sub-cycle.

A battery is connected across the two terminals at the bottom of Figure 3 and the stepping circuit of the first uniselector is completed as follows: Left hand battery terminal-DM1-T3-right hand battery terminal. The second uniselector is stepped only once per sweep of the first uniselector over a selected one of the contacts of the latter, over the path, comprising the left hand battery terminal-the wiper and ninth contact of the bank contacts C1 of the first uniselector-DM2-right hand battery terminal.

The various processes of the cycle controlled directly by the first uniselector (drain pipe, saline, antagonist reservoirs, etc., as described above) are operated over the path—left hand battery terminal-wiper and contact of the first uniselector-valve relay connected to the contact on which wiper is resting-connection (not shown) from other side of valve relay in question to right hand battery terminal.

The valve relays which control the drug solution reservoirs are selected and controlled via the second uniselector over the following path—left hand battery terminal-the wiper and twentieth contact of bank contacts C1 of the first uniselector-wiper and bank contact of the second uniselector-valve relay connected to contact of the second uniselector on which the wiper is resting-connection (not shown) from other side of valve relay in question, to right hand battery terminal.

As only four drug reservoirs are provided, the valve relays controlling them may be connected to the first four bank contacts A2 and the connections repeated to succeeding groups of four contacts round the bank, the order being varied if required as between the groups. The sequence of drug additions can thus be repeated a number of times and the order of addition changed each time in a predetermined random manner, the setting up of the various orders being facilitated by the provision of a jumper field between the A2 contacts and the valve relays controlling the drug reservoirs.

The operation of the apparatus is as follows: When the power is switched on, with the A1 and B1 wipers on the first contacts of their respective banks (to which position the switch may be set by a conventional "homing" circuit not shown), the tube 27 executes the cycle of operations previously described resulting in the rise of the cathode current to a point at which the relay T is operated. The time taken to reach this point depends upon the value of the resistor R and capacitor C connected to the particular contacts of A1 and B1 on which the respective wipers are standing. The operation of T short circuits at T1 the particular capacitor C selected by B1, and at T3 pulls up the magnet DM1. T releases on the fall of the cathode current of 27 (due to short circuiting of the capacitor C at T1), and uniselector 1 (which is of the type which steps by spring action on the release of its magnet DM1), is moved one step by the release of DM1. A1 and B1 wipers then move to different contacts bringing a different resistor R and capacitor C into circuit with tube 27 which commences a new cycle of rising and falling cathode current with a different timing. This new cycle of tube 27 results in a further step of uniselector 1. Uniselector 1 continues to step round its contacts in this way, repeating its rotations. The third bank C1 has a number of its contacts connected to individual valves such as that of Figure 2 which operate from the battery connection on C1 wiper to control a sequence of operations of washing out, draining, and rest for the bath containing the organ, these operations being timed by the wiring of resistors R and connection by the switch S of capacitors C, to the contacts of A1 and B1 respectively and by appropriate adjustment of the resistors R. Several of these operations can have the same time interval so that several contacts round the banks A1 and B1 can be commoned to the same R/C combination.

When C1 wiper reaches a certain predetermined contact (the ninth contact in the arrangement of Figure 3) the battery connection on C1 wiper is extended over that contact to energize the drive magnet DM2 which holds up during the time that C1 wiper remains on that contact under control of the timing circuit of tube 27. When uniselector 1 steps off that contact, DM2 releases and the spring-assisted recoil of its armature steps A2 one step. Any contact of C1 can be chosen for stepping A2 and it need not be a contact unoccupied by a control valve provided there is enough battery power to pull up DM2 in parallel with a control valve. In the arrangement illustrated, the "rest" periods for the organ bath are not accompanied by operation of a valve as they are arranged to perpetuate the condition brought about by the immediately preceding valve operation. It is therefore convenient to utilise these contacts for other purposes such as the operation of DM1. When C1 reaches a later contact (the twentieth contact in the arrangement of Figure 3), the battery connection on C1 wiper is extended to A2 wiper connected to that contact. The A2 bank contacts are connected to individual drug application valves and while C1 wiper remains on the contact in question there is an operating battery connection over the C1 and A2 wipers to the particular drug valve connected to the A2 contact on which A2 wiper is for the moment standing, this having been changed earlier in the circuit of the wipers of uniselector 1 over their bank contacts. Uniselector 1 repeatedly sweeps round its contacts in individually timed steps and once in each time around, it first changes the drug connection and then applies a changed drug to the organ bath, the effect of which is measured and recorded by pen 6 and drum 7 of Figure 1.

The arrangement illustrated was designed to apply a maximum of four drugs in succession repeatedly and in a different order each time. A2 was chosen as a standard 25-contact uniselector and the contacts divided into groups of four each contact of each group being connected to one of the drug valves but in a different order of the four valves in each group. These connections are set up by means of the jumper field previously referred to and in practice are arranged on a systematic plan designed to average out random errors.

Switches may be provided to change certain steps in the process, for instance the usual washing out step prior to drug application may be replaced by the application of an antagonist drug. It is also possible to override the timing device at certain stages of the progress of uniselector 1 (e. g. the usual rest periods before drug application) by connecting certain contacts of C1, via a switch, to a homing circuit, from the battery on C1 wiper, chosen contacts of C1, the said switch, C1 self-driven interruptor contacts INT1, and DM1 to earth (i. e. the other battery terminal). Any unused contacts of A2 (e. g. the 25th contact of a 25-contact switch with six groups of four) can be automatically by-passed by connecting the contacts in question to DM2 via the A2 self-interruption contacts INT2.

It will be understood that the uniselectors used need not be of the rotary type indicated in the drawings. The term "multi-bank uniselector" is intended to include, where the context permits, any electromechanical switching device having movable wipers which are actuated in unison by electromagnetic means so that each makes contact successively with the contacts of one of a number of banks of contacts. The uniselectors shown in the drawings are generally provided with further banks of contacts in addition to those shown. Thus, for example, the first uniselector may have a further bank whose contacts are connected to signal lamps for indicating the stage reached in the assay sub-cycle, and the second uniselector may have a further bank similarly affording an indication of the stage reached in the whole cycle, or of the nature of the drug solution last added.

We claim:

1. A control circuit for controlling the addition and removal of fluids in succession to and from an organ sensitive to some of such fluids comprising a uniselector having at least three contact banks, a thermionic tube timing circuit adapted on energization to execute a cycle of rising and falling cathode current through the tube the duration of which is dependent on the selection for inclusion in the circuit of a resistor and a capacitor from a number of adjustable resistors and capacitors, connections from each of the resistors and capacitors to a contact of the first and second banks respectively of the uniselector, relay means operated by the cathode current of the tube for operating the drive magnet of the uniselector and for resetting the timing circuit, arranged so that each step of the uniselector is made under control of the relay means after a time interval individually determined by the resistor and capacitor connected to contacts of the said first and second banks respectively contacted by the wipers of those banks, connections from contacts of a third bank of the uniselector to a plurality of electro-magnetic devices controlling passages between reservoirs containing the said fluids and a bath containing the said organ, and from the said bath and a power connection to the wiper of the said third bank whereby the electro-magnetic device connected to a contact of the bank is operated when that contact is contacted by the said wiper, a second uniselector having at least one bank of contacts, a connection from a contact of the third bank of the first uniselector to the drive magnet of the second uniselector whereby the second uniselector is stepped as a result of the wiper of the said third bank contacting its said contact connected to the drive magnet of the second uniselector, a connection from another contact of the said third bank of the first uniselector to the wiper of the second uniselector, connections from the contacts of the second uniselector to electro-magnetic devices controlling passages between reservoirs containing those of the said fluids to which the said organ is sensitive and a bath containing the said organ whereby the power connection to the wiper of the said third bank is extended over the said contact of that bank and over the wiper of the second uniselector to operate a different one of the electro-magnetic devices connected to contacts of the second uniselector in each of a recurring cycle of operations, controlled by the first uniselector, consisting of the operation of a succession of the electro-magnetic devices connected directly to contacts of the first uniselector and the operation of one of the electro-magnetic devices connected to contacts of the second uniselector during and at a predetermined point in each cycle.

2. A control circuit for controlling the addition and removal of fluids in succession to and from an organ sensitive to some of such fluids comprising a uniselector having at least three contact banks, a thermionic tube timing circuit adapted on energization to execute a cycle of rising and falling cathode current through the tube the duration of which is dependent on the selection for inclusion in the circuit of a resistor and a capacitor from a number of adjustable resistors and capacitors, connections from each of the resistors and capacitors to a contact of the first and second banks respectively of the uniselector, relay means operated by the cathode current of the tube for operating the drive magnet of the uniselector and for resetting the timing circuit, arranged so that each step of the uniselector is made under control of the relay means after a time interval individually determined by the resistor and capacitor connected to contacts of the said first and second banks respectively contacted by the wipers of those banks, connections from contacts of a third bank of the uniselector to a plurality of electro-magnetic devices controlling passages between reservoirs containing the said fluids and a bath containing the said organ, and from the said bath and a power connection to the wiper of the said third bank whereby the electro-magnetic device connected to a contact of the bank is operated when that contact is contacted by the said wiper, a second uniselector having at least one bank of contacts, a connection from a contact of the third bank of the first uniselector to the drive magnet of the second uniselector whereby the second uniselector is stepped as a result of the wiper of the said third bank contacting its said contact connected to the drive magnet of the second uniselector, a connection from another contact of the said third bank of the first uniselector to the wiper of the second uniselector, connections from the contacts of the second uniselector to electro-magnetic devices controlling passages between reservoirs containing those of the said fluids to which the said organ is sensitive and a bath containing the said organ whereby the power connection to the wiper of the said third bank is extended over the said contact of that bank and over the wiper of the second uniselector to operate a different one of the electro-magnetic devices connected to contacts of the second uniselector in each of a recurring cycle of operations, controlled by the first uniselector, consisting of the operation of a succession of the electro-magnetic devices connected directly to contacts of the first uniselector and the operation of one of the electro-magnetic devices connected to contacts of the second uniselector during and at a predetermined point in each cycle, the number of the said electro-magnetic devices controlling passages from the reservoirs containing fluids to which the organ is sensitive being less than the number of bank contacts of the second uniselector and the said devices being connected to a first set of consecutive contacts of the second uniselector in one order and to a second set of following consecutive contacts in a different order.

3. A control circuit for controlling the addition and removal of fluids in succession to and from an organ sensitive to some of such fluids comprising a uniselector having at least three contact banks, a thermionic tube timing circuit adapted on energization to execute a cycle of rising and falling cathode current through the tube the duration of which is dependent on the selection for inclusion in the circuit of a resistor and a capacitor from a number of adjustable resistors and capacitors, connections from each of the resistors and capacitors to a contact of the first and second banks respectively of the uniselector, relay means operated by the cathode current of the tube for operating the drive magnet of the uniselector and for resetting the timing circuit, arranged so that each step of the uniselector is made under control of the relay means after a time interval individually determined by the resistor and capacitor connected to contacts of the said first and second banks respectively contacted by the wipers of those banks, connections from contacts of a third bank of the uniselector to a plurality of electro-magnetic devices controlling passages between reservoirs containing the said fluids and a bath containing the said organ, and from the said bath and a power connection to the wiper of the said third bank whereby the electro-magnetic device connected to a contact of the bank is operated when that contact is contacted by the said wiper, a second uniselector having at least one bank of contacts, a connection from a contact of the third bank of the first uniselector to the drive magnet of the second uniselector whereby the second uniselector is stepped as a result of the wiper of the said third bank contacting its said contact connected to the drive magnet of the second uniselector, a connection from another contact of the said third bank of the first uniselector to the wiper of the second uniselector, connections from the contacts of the second uniselector to electro-magnetic devices controlling passages between reservoirs containing those of the said fluids to which the said organ is sensitive and a bath containing the said organ whereby the power connection to the wiper of the said third bank is extended over the said contact of that bank and over the wiper of the second uniselector to operate a different one of the electro-magnetic devices connected to contacts of the second uniselector in each of a recurring cycle of operations, controlled by the first uniselector, consisting of the operation of a succession of the electro-magnetic devices connected directly to contacts of the first uniselector and the operation of one of the electro-magnetic devices connected to contacts of the second uniselector during and at a predetermined point in each cycle, the number of the said electro-magnetic devices controlling passages from the reservoirs containing fluids to which the organ is sensitive being less than the number of bank contacts of the second uniselector and the said devices being connected to a first set of consecutive contacts of the second uniselector in one order and to a second set of following consecutive contacts in a different order, and a cross-connection field between the bank contacts of the second uniselector and the electro-magnetic devices controlling passages from the reservoirs containing fluids to which the organ is sensitive, the said field comprising means for preselecting the order in which the said fluids are applied to the organ in successive cycles of operations controlled by the first uniselector.

References Cited in the file of this patent

UNITED STATES PATENTS

| | | |
|---|---|---|
| 1,514,751 | Wold | Nov. 11, 1924 |
| 1,914,215 | Price | June 13, 1933 |
| 2,439,857 | Millikan | Apr. 20, 1948 |
| 2,444,208 | Taylor et al. | June 29, 1948 |
| 2,461,266 | Gay | Feb. 8, 1949 |
| 2,579,598 | Morrison | Dec. 25, 1951 |
| 2,641,316 | Brown et al. | June 9, 1953 |
| 2,652,197 | Berger | Sept. 15, 1953 |
| 2,673,609 | Calvi | Mar. 30, 1954 |

OTHER REFERENCES

Godfrey et al.: "An Automatic Assay Apparatus," pages 381–388 British Journal of Pharmacology and Chemotherapy, British Medical Assoc., vol. 5, 1950.

Berry: "An Investigation of the Active Principles of Digitalis Purpurea." The Pharmaceutical Journal and Pharmocist, Dec. 25, 1915, page 783.